Aug. 18, 1936.   C. J. BROWN   2,051,466
VEHICLE HEADLIGHT
Filed April 20, 1934

INVENTOR.
Clarence J. Brown
BY John J. McLaughlin
ATTORNEY.

Patented Aug. 18, 1936

2,051,466

UNITED STATES PATENT OFFICE 2,051,466

VEHICLE HEADLIGHT

Clarence J. Brown, Chicago, Ill.

Application April 20, 1934, Serial No. 721,561

2 Claims. (Cl. 240—41.35)

My invention relates in general to a vehicle headlight, and more in particular to a non-glare automobile headlight.

The object of my invention was to attack the problem of headlight glare from the standpoint of preventing glaring action of the headlight itself while at the same time providing ample illumination.

A further object of the invention was to provide a non-glare headlight involving substantially no more cost than ordinary headlights and simple to manufacture and service.

Other specific objects will appear from the following detailed description taken with the accompanying drawing, wherein Fig. 1 is a longitudinal vertical sectional view taken through a headlight, showing one embodiment of my invention;

According to the main features of my invention, I employ substantially the conventional headlight casing, lamp, reflector, and main casing closing lens, but with such features I also employ a non-glare lens system having the effect of reducing glaring side radiations to a minimum but assisting in projecting the main body of light well out and along the road to permit the driver ample vision in front of him during driving. At the same time, sufficient illumination is provided for at the side of the road for ordinary driving purposes.

Figure 1:
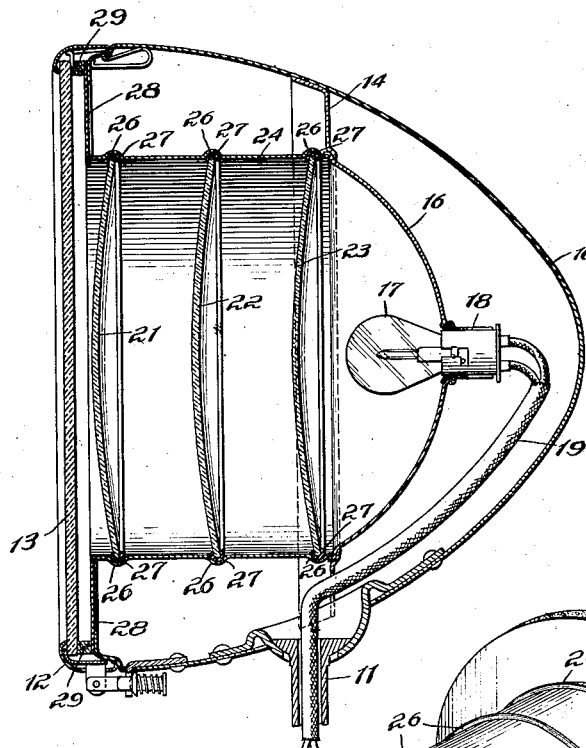
Figure 2:
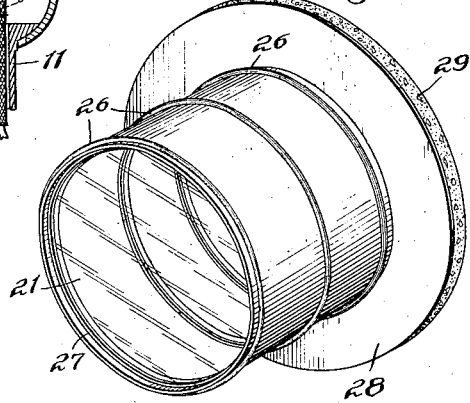
Fig. 2 is a perspective view of a detail of the headlight.

Referring now to Figs. 1 and 2 of the drawing, I show an outer casing 10 having an attaching bracket 11 with a detachable cover member 12 fitted with the usual front lens 13. This portion of the lamp may be of substantially standard construction, it being understood that any suitable outer casing may be used which provides for a front lens fitted to a dust-proof casing.

Within the casing 10, I provide an annular reflector support 14 which carries a concave reflector 16. This reflector is of suitable shape to project light from a lamp 17 forwardly in the form of a beam. A reflector of general parabolic shape may be used for the purpose. The lamp is supported in a socket 18 extending through the center portion of the reflector and carried thereby. Wires 19 leading to the socket are led out of the casing in a suitable manner to be connected to a source of power.

The non-glare feature of the headlight consists of the use of a plurality of concave-convex lenses positioned between the lamp 17 and the front headlight lens 13. These lenses are formed relatively thin and are only slightly tinted so as to avoid shielding out any major proportion of the light rays. I find that various color combinations may be employed in the three lenses, but I have found that the best results are obtained if lens 21 has a slight green tint, lens 22 a yellow tint, and lens 23 a blue tint. I cannot explain the reason why a combination of lenses of this character has the effect of softening the light without cutting down the amount of light appreciably, nor do I understand why the particular combination of colors described produces unusually good results. The results, however, are unmistakable.

The most convenient manner of employing the lens feature is by the utilization of a cylindrical support 24, this cylindrical support having annular grooves 26 in which the lenses are supported. The outer edges of the lenses are provided with packing rings 27 which may be cork, semi-soft rubber or other suitable material which will prevent ordinary jars from cracking the lenses. An annular radial extension 28 is provided on the cylindrical support 24 which may be a mere extension of the cylindrical support or may be secured thereto by suitable means such as brazing. This portion 28 carries an annular peripheral cork strip 29 so that the portion 28 bearing against the edge of the container 18, the lens 13 may engage the cork ring 28 tightly and thereby not only hold the non-glare lens assembly in position, but also assist in maintaining a dust-tight joint. It is understood, of course, that other materials may be used in place of cork for the ring 29.

Fig. 2 shows the non-glare lens assembly removed from the headlight casing. This is a feature of the invention. Should any difficulty be encountered with the lamp 17, the front cover of the headlight casing can be opened, the entire non-glare assembly easily removed, and the lamp 17 replaced. Thus, although a compound lens system is provided, the lamp is substantially just as accessible for servicing as with the ordinary, simple, present day headlamp. It should be noted that all of the usual features employed on present day headlamps can be employed with my invention. Lamps having two filaments, the use of dim and bright lamps separately, and other features, can be used with my invention.

In the use of my invention, it appears to be of some importance that the separate lenses 21, 22 and 23 be equally spaced from each other and all of them spaced slightly from both the front lens 13 and the lamp 17. I have found that I obtain very excellent results if the space between the successive non-glare lenses is one and one-half to two inches. It is understood, however, that I am not limited to any specific spacing or distance between successive lenses, but I may use various combinations with good results.

Figure 3:
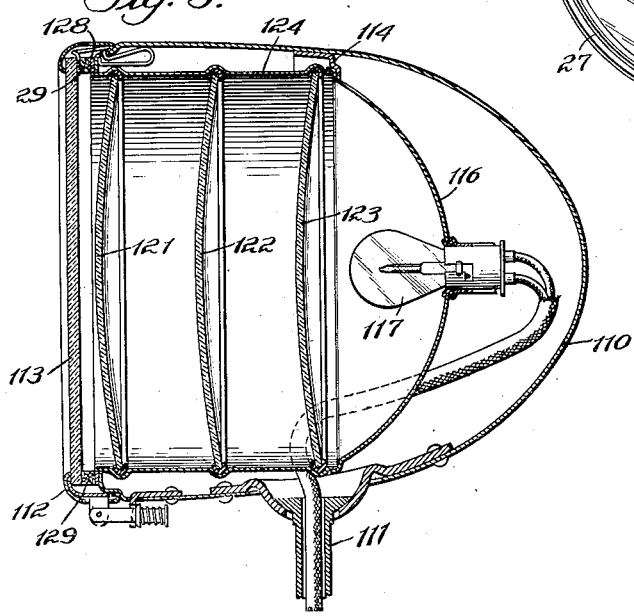
Fig. 3 is a modified construction.

In Fig. 3 I show a modification showing substantially all of the features shown in Fig. 1. For convenience, the same reference characters are employed as those used in Fig. 1 but with the digit "1" employed as a prefix in each case. In the showing of Fig. 3, the outside configuration of the lamp has been modified and other features slightly modified accordingly. The non-glare assembly, however, is also separately removable.

What I claim as new and desire to protect by Letters Patent of the United States is:

1. A non-glare headlight comprising a source of light, a curved surface reflector positioned in back of said source of light, and three tinted concavo-convex lenses spaced from each other and positioned in front of said source of light and equally spaced from each other, said lenses being tinted, blue, amber and green, respectively, and said lenses not being sufficiently deeply colored to decrease materially the amount of light from said source.

2. A non-glare device adapted to be inserted in an automobile headlight, said non-glare device comprising three concavo-convex lenses, tinted yellow, blue and green, means including a casing for supporting said lenses at equal distances from each other, and means for supporting said casing means within a headlight casing whereby to direct the light therefrom through said lenses, said lenses not being colored deeply enough to materially decrease the amount of light from a light source.

CLARENCE J. BROWN.